United States Patent
Ferris et al.

(10) Patent No.: US 7,471,483 B1
(45) Date of Patent: Dec. 30, 2008

(54) DISK DRIVE COMPENSATING FOR ROTATIONAL VIBRATIONS, PHYSICAL SHOCKS, AND THERMAL POPPING

(75) Inventors: Timothy A. Ferris, Mission Viejo, CA (US); Alain Chahwan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/857,768

(22) Filed: Sep. 19, 2007

(51) Int. Cl.
*G11B 21/02* (2006.01)
(52) U.S. Cl. ........................................................ 360/75
(58) Field of Classification Search ................. None
See application file for complete search history.

(56) References Cited

U.S. PATENT DOCUMENTS

| | | | |
|---|---|---|---|
| 6,031,317 A | 2/2000 | Chen | |
| 6,115,200 A | 9/2000 | Allen et al. | |
| 6,538,839 B1 | 3/2003 | Ryan | |
| 6,629,462 B2 | 10/2003 | Otsuchi et al. | |
| 6,674,600 B1 | 1/2004 | Codilian et al. | |
| 6,710,966 B1 | 3/2004 | Codilian et al. | |
| 6,909,574 B2 | 6/2005 | Aikawa et al. | |
| 6,914,743 B1 | 7/2005 | Narayana et al. | |
| 6,952,318 B1 | 10/2005 | Ngo | |
| 6,958,882 B2 | 10/2005 | Kisaka | |
| 6,967,804 B1 | 11/2005 | Codilian | |
| 7,142,385 B2 | 11/2006 | Shimotono et al. | |
| 7,154,690 B1 | 12/2006 | Brunnett et al. | |
| 2004/0075949 A1* | 4/2004 | Dague et al. | 360/265.8 |

* cited by examiner

*Primary Examiner*—K. Wong
(74) *Attorney, Agent, or Firm*—Howard H. Sheerin, Esq.

(57) ABSTRACT

A disk drive is disclosed comprising a disk, and a head actuated radially over the disk. A first linear acceleration signal is generated representing a first acceleration disturbance, a second linear acceleration signal is generated representing a second acceleration disturbance, and a third linear acceleration signal is generated representing a thermal popping disturbance. The first linear acceleration signal is combined with the third linear acceleration signal to generate a fourth linear acceleration signal representing a combined physical shock disturbance and thermal popping disturbance.

17 Claims, 4 Drawing Sheets

DISK DRIVE COMPENSATING FOR ROTATIONAL VIBRATIONS, PHYSICAL SHOCKS, AND THERMAL POPPING

BACKGROUND

1. Field

The present invention relates to disk drives for computer systems. In particular, the present invention relates to a disk drive compensating for rotational vibrations, physical shocks, and thermal popping.

2. Description of the Related Art

FIG. 1 shows a prior art disk drive comprising a disk 2 and a head 4 connected to a distal end of an actuator arm 6 which is rotated about a pivot by a voice coil motor (VCM) 8 to position the head 4 radially over the disk 2. The disk 2 comprises a number of concentric data tracks 10 each partitioned into a number of data sectors. Access operations are performed by seeking the head 4 to a target data track, and performing a write/read operation on the data sectors within the data track. The disk 2 comprises embedded servo sectors $12_0$-$12_N$ having position information recorded therein, such as coarse position information (e.g., a track address) and fine position information (e.g., servo bursts). Control circuitry 14 processes the read signal 16 emanating from the head 4 in order to demodulate the servo sectors $12_0$-$12_N$ into a control signal 18 applied to the VCM 8 in order to position the head 4 over the target data track.

The control circuitry 14 in FIG. 1 compensates for rotational vibrations, which can degrade the servo performance, as well as physical shocks to the disk drive which may cause the head 4 to deviate from the target track and corrupt data recorded in an adjacent track during a write operation. For rotational vibrations, the control circuitry 14 employs a technique referred to as Rotational Acceleration Feed-Forward (RAFF) compensation wherein a feed-forward signal is generated so that the servo system follows the disturbance in the servo loop due to a rotational vibration which is detected by a suitable accelerometer, such as a pair of piezoelectric sensors 20A and 20B shown in FIG. 1. The output of the vibration sensors 20A and 20B are amplified/filtered using suitable circuits 22A and 22B, the outputs of which are subtracted and summed, and then further amplified/filtered using suitable circuits 24A and 24B to generate a RAFF difference signal 26 and a RAFF sum signal 28. The control circuitry 14 processes the RAFF difference signal 26 and the RAFF sum signal 28 to generate a suitable feed-forward compensation signal injected into the servo control loop.

A second accelerometer, such as a piezoelectric sensor 30, is used to detect physical shocks to the disk drive. Typically the piezoelectric sensor 30 would be responsive to physical shocks in the 0.1 to 1 kHz range. The output of the piezoelectric sensor 30 is amplified/filtered using a suitable circuit 32 to generate a shock detect signal 34 monitored by the control circuitry 14. The circuit 32 is typically a filter that enhances signals in the same range as the physical shocks, i.e., 0.1 to 1 kHz. If during a write operation the magnitude of the shock detect signal 34 exceeds a threshold (positive or negative), the control circuitry aborts the write operation to help minimize adjacent track overwrite.

Thermal popping is another disturbance to the servo system due to mechanically mated parts that have different coefficients of thermal expansion. Similar to physical shocks, thermal popping may cause the head 4 to deviate from the target track and overwrite an adjacent track during a write operation. However, thermal popping typically manifests at much higher frequencies than physical shocks, and if the bandwidth of the physical shock detector shown in FIG. 1 is increased to cover thermal popping events, the shock detector may detect too many false shock events which will degrade the performance of the disk drive.

There is, therefore, a need to reliably detect and compensate for rotational vibrations, physical shocks, and thermal popping in a disk drive.

SUMMARY OF THE EMBODIMENTS OF THE INVENTION

An embodiment of the present invention comprises a disk drive including a disk, and a head actuated radially over the disk. A first linear acceleration signal is generated representing a first acceleration disturbance, a second linear acceleration signal is generated representing a second acceleration disturbance, and a third linear acceleration signal is generated representing a thermal popping disturbance. The first linear acceleration signal is combined with the third linear acceleration signal to generate a fourth linear acceleration signal representing a combined physical shock disturbance and thermal popping disturbance.

In one embodiment, the first and second linear acceleration signals are combined to generate a rotational acceleration signal representing a rotational vibration disturbance. In one embodiment, a feed-forward compensation signal is generated and used to servo the head in response to the rotational acceleration signal.

In another embodiment, a write operation is aborted if the fourth linear acceleration signal exceeds a threshold.

In another embodiment, a major frequency range of the thermal popping disturbance is substantially higher than a major frequency range of the physical shock disturbance.

In yet another embodiment, an adder adds the first linear acceleration signal to the third linear acceleration signal to generate the fourth linear acceleration signal.

In still another embodiment, a first acceleration sensor detects the first acceleration disturbance, and a second acceleration sensor detects the thermal popping disturbance. A first filter filters the output of the first acceleration sensor to generate the first linear acceleration signal, wherein a bandwidth of the first filter substantially covers major frequency ranges of the first acceleration disturbance and the physical shock disturbance. A second filter filters the output of the second acceleration sensor to generate the third linear acceleration signal, wherein a bandwidth of the second filter substantially covers major frequency ranges of the thermal popping disturbance. In one embodiment, a gain of the second filter is greater than a gain of the first filter.

Another embodiment of the present invention comprises a method of operating a disk drive, the disk drive comprising a disk, and a head actuated radially over the disk. A first linear acceleration signal is generated representing a first acceleration disturbance, a second linear acceleration signal is generated representing a second acceleration disturbance, and a third linear acceleration signal is generated representing a thermal popping disturbance. The first linear acceleration signal is combined with the third linear acceleration signal to generate a fourth linear acceleration signal representing a combined physical shock disturbance and thermal popping disturbance.

DETAILED DESCRIPTION OF EMBODIMENTS OF THE INVENTION

Figure 2:
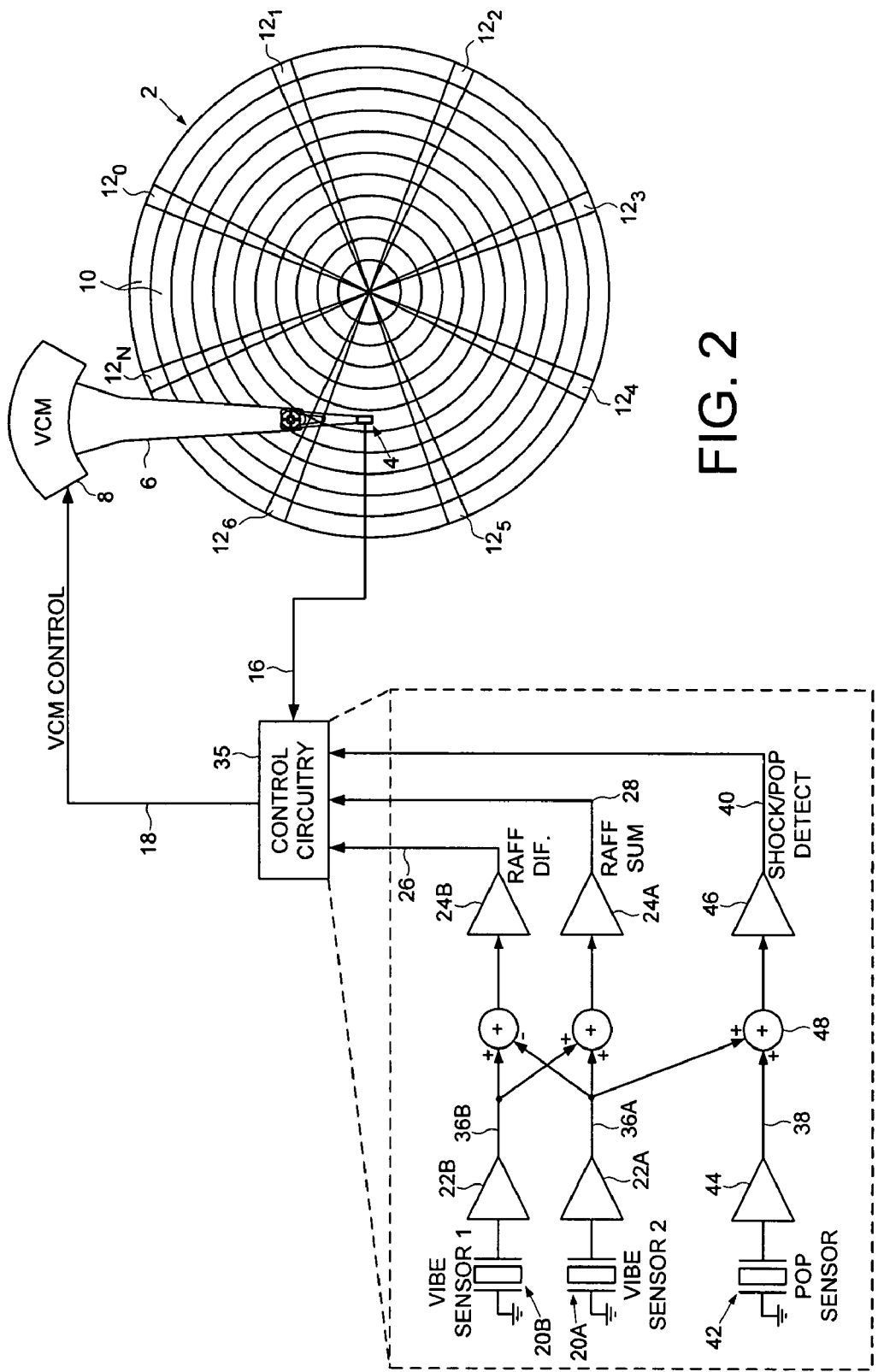
FIG. 2 shows a disk drive according to an embodiment of the present invention comprising a pop sensor for detecting a thermal popping disturbance, wherein the output of the pop sensor is combined with a linear acceleration signal to detect the physical shock disturbance.

FIG. 2 shows a disk drive according to an embodiment of the present invention comprising disk 2, and a head 4 actuated radially over the disk 2. The disk drive further comprises control circuitry 35 operable to generate a first linear acceleration signal 36A representing a first acceleration disturbance, a second linear acceleration signal 36B representing a second acceleration disturbance, and a third linear acceleration signal 38 representing a thermal popping disturbance. The first linear acceleration signal 36A is combined with the third linear acceleration signal 38 to generate a fourth linear acceleration signal 40 representing a combined physical shock disturbance and thermal popping disturbance.

Figure 1:
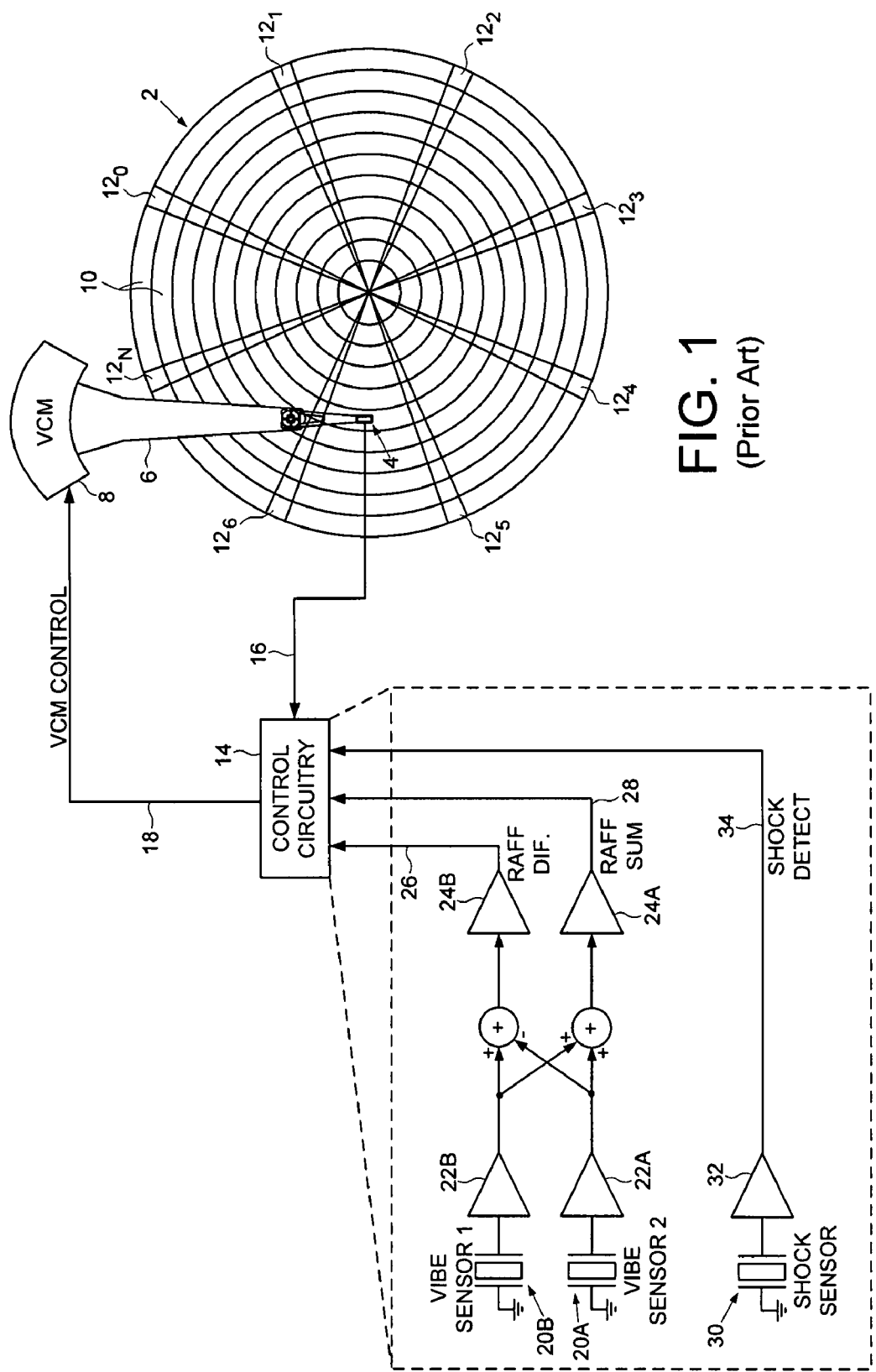
FIG. 1 shows a prior art disk drive comprising two vibration sensors for generating two linear acceleration signals that are combined to sense a rotational vibration disturbance, and a separate shock sensor for detecting a physical shock disturbance.

Similar to the prior art disk drive of FIG. 1, in one embodiment, the first and second linear acceleration signals 36A and 36B are combined to generate a rotational acceleration signal representing a rotational vibration disturbance. In one embodiment, a feed-forward compensation signal is generated and used to servo the head in response to the rotational acceleration signal. In the embodiment shown in FIG. 2, the output of the vibration sensors 20A and 20B are amplified/filtered using suitable circuits 22A and 22B, the outputs of which are subtracted and summed, and then further amplified/filtered using suitable circuits 24A and 24B to generate a Rotational Acceleration Feed-Forward (RAFF) difference signal 26 and a RAFF sum signal 28. The control circuitry 35 processes the RAFF difference signal 26 and the RAFF sum signal 28 to generate a suitable feed-forward compensation signal injected into the servo control loop.

In the embodiment shown in FIG. 2, the head 4 is connected to a distal end of an actuator arm 6 which is rotated about a pivot by a voice coil motor (VCM) 8 to position the head 4 radially over the disk 2. The disk 2 comprises a number of concentric data tracks 10 each partitioned into a number of data sectors. Access operations are performed by seeking the head 4 to a target data track, and performing a write/read operation on the data sectors within the data track. The disk 2 comprises embedded servo sectors $12_0$-$12_N$ having position information recorded therein, such as coarse position information (e.g., a track address) and fine position information (e.g., servo bursts). The control circuitry 35 processes the read signal 16 emanating from the head 4 in order to demodulate the servo sectors $12_0$-$12_N$ into a control signal 18 applied to the VCM 8 in order to position the head 4 over the target data track.

In one embodiment, the control circuitry 35 may abort a write operation if the fourth linear acceleration signal 40 exceeds a threshold. That is, if a physical shock or thermal popping disturbance of sufficient magnitude is detected, then the write operation may be aborted to help minimize adjacent track overwrite.

In one embodiment, the vibration sensors 20A and 20B, as well as the thermal popping sensor 42, comprise a piezoelectric sensor. In one embodiment, the thermal popping sensor 42 of FIG. 2 has the same frequency response as the physical shock sensor 30 in the prior art disk drive of FIG. 1. In an alternative embodiment, the frequency response of the thermal popping sensor 42 of FIG. 2 is significantly different than the frequency response of the physical shock sensor 30 of FIG. 1. However, by combining the output 38 of the thermal popping sensor 42 and the amplifier/filter 44 with the output 36A of one of the vibration sensors 20A and the amplifier/filter 22A, the physical shock sensor 30 in the prior art disk drive of FIG. 1 is obviated while the system may still detect physical shock disturbances as well as thermal popping disturbances, thereby reducing the cost and complexity of the disk drive.

The circuitry 32 for amplifying/filtering the output of the physical shock sensor 30 in the prior art disk drive of FIG. 1 may comprise suitable active components (e.g., op-amp) and passive components (e.g., capacitors and resistors). In the embodiment of FIG. 2, the passive components (resistors and/or capacitors) of the amplifier/filter 44 are changed from those in circuitry 32 so as to be responsive to thermal popping (the thermal popping sensor 42 may be the same as the physical shock sensor 30 of FIG. 1 or different). Also in the embodiment of FIG. 2, an amplifier/filter 46 comprising suitable passive components has been added in order to further shape the desired frequency response.

Figure 3:
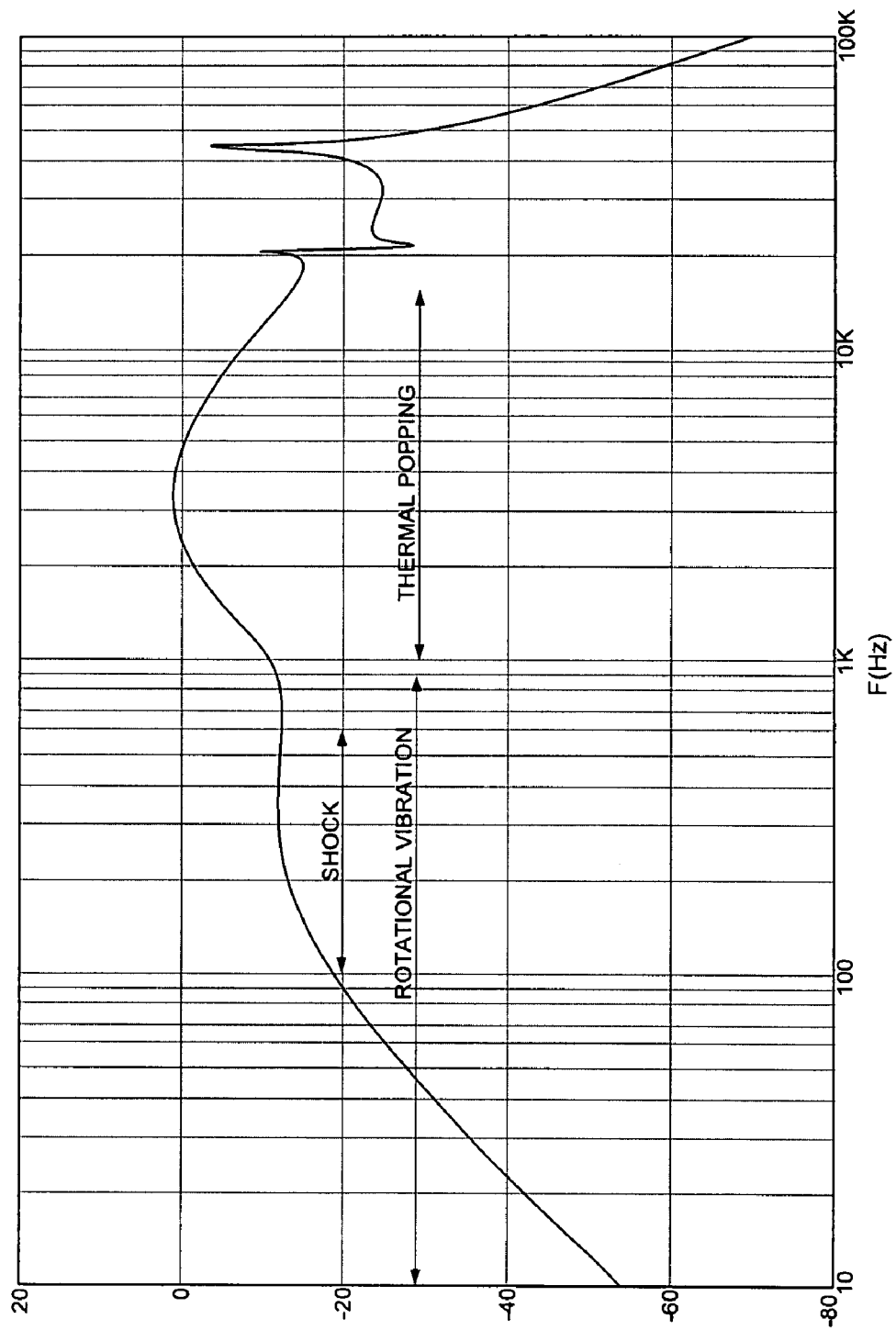
FIG. 3 shows an exemplary frequency response of the sensor and filter circuitry for detecting the thermal popping and physical shock disturbances according to an embodiment of the invention.

FIG. 3 shows an example frequency response of the circuitry for detecting the shock and pop disturbances (vibe sensor 20A, amplifier/filter 22A, pop sensor 42, amplifier/filter 44, adder 48, and amplifier filter 46). As shown in FIG. 3, in one embodiment a major frequency range of the thermal popping disturbance is substantially higher than a major frequency range of the physical shock disturbance. However, because the major frequency range of the physical shock disturbance overlaps the frequency range of the rotational vibration disturbance, the vibration sensor 20A may advantageously be used for detecting both the rotational vibration disturbance and the physical shock disturbance.

In the embodiment of FIG. 3, the passive components of the amplifier/filters are selected such that a bandwidth of the amplifier/filter 22A substantially covers major frequency ranges of the acceleration disturbance due to a rotational vibration as well as the major frequency ranges of the physical shock disturbance, and a bandwidth of the amplifier/filter 44 substantially covers the major frequency ranges of the thermal popping disturbance. Also in the embodiment of FIG. 3, the passive components of the amplifier/filters may be selected such that the gain of amplifier/filter 44 is greater than the gain of amplifier/filter 22A. In this manner, the sensitivity to physical shocks is less than that of thermal popping in order to reduce the number of false triggers due to minor physical shocks and vibrations. The gain of the amplifier/filter 44 may be equal or less than amplifier/filter 22A in other embodiments, for example, when false triggers due to minor physical shocks and vibrations are not a substantial concern.

Any suitable circuitry may be employed to implement the high level circuit diagram shown in FIG. 2. For example, FIG. 4 shows a suitable circuit diagram comprising the vibration sensors 20A and 20B, the pop sensor 42, and suitable amplifier/filter circuitry including active components (op-amps)

and passive components (resistors and capacitors). The adder 48 of FIG. 2 is implemented as a current summing junction in the embodiment of FIG. 4.

Figure 4:
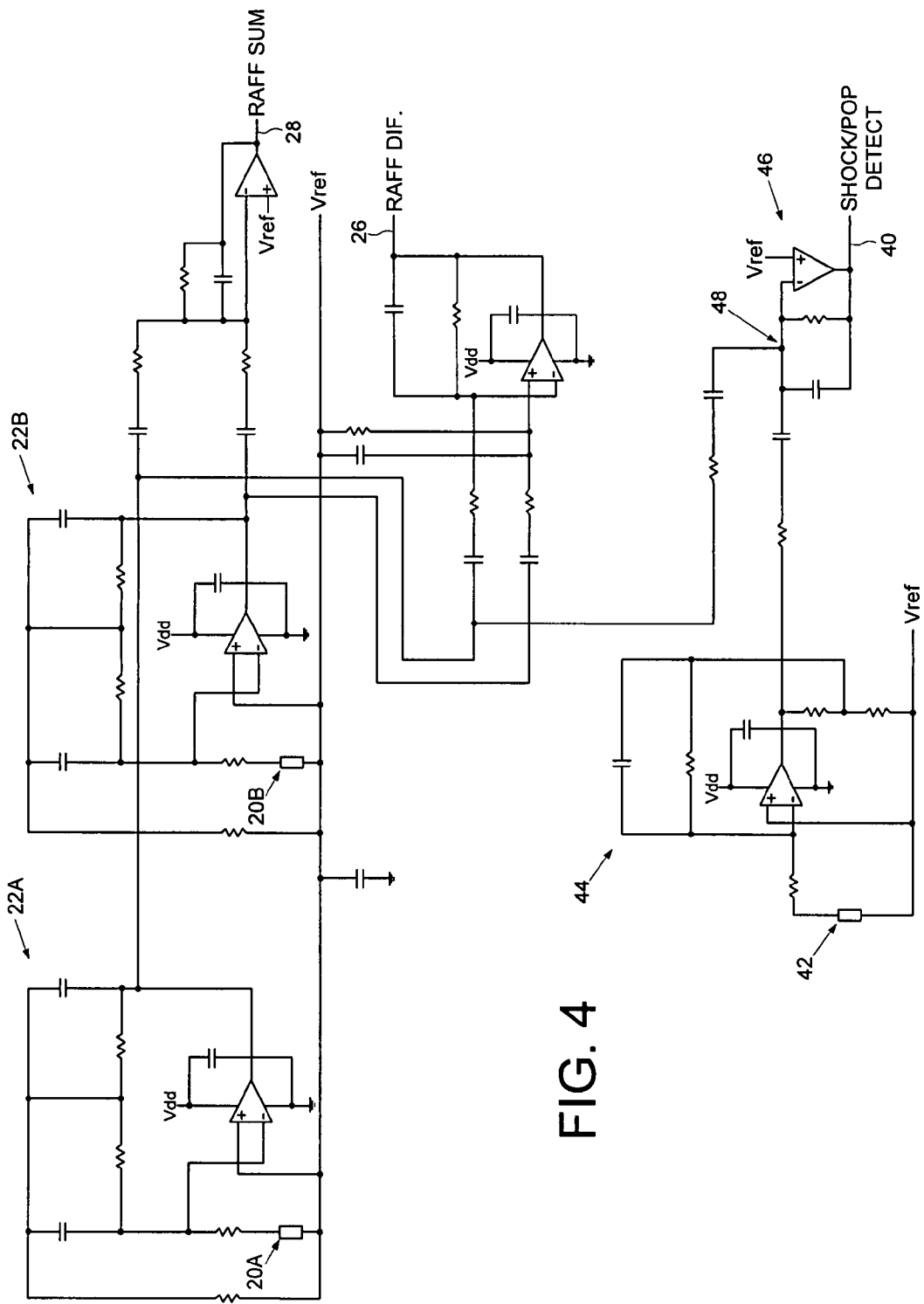
FIG. 4 shows circuitry according to an embodiment of the present invention for implementing the vibration sensors, pop sensor, and attendant filtering circuitry.

Any suitable design specifications may be ascribed to the components shown in FIG. 4, including the sensors, op-amps, resistors, and capacitors so that the desired frequency response is obtained, such as the frequency response shown in FIG. 3. Other design considerations may also be employed to achieve the desired frequency response, such as mounting the vibration sensor 20A physically near the pop sensor 42 on the printed circuit board. In one embodiment, the components shown in FIG. 4 are selected and manufactured into a family of disk drives, and in an alternative embodiment, one or more of the components (e.g., the passive components) are dynamically configured within each disk drive using a suitable calibration procedure.

One or more of the components in FIG. 4 may be integrated into a circuit together with a microprocessor (a system on a chip or SOC), or one or more of the components may be integrated within a separate chip. In yet another embodiment, some of the components (e.g., the sensors) may be fabricated within an integrated circuit, or in an alternative embodiment, implemented as a separate discrete component connected to an integrated circuit. In addition, the control circuitry 35 of FIG. 2 may comprise any suitable servo circuitry for processing the RAFF signals 26 and 28, as well as suitable circuitry for aborting a write operation in response to the shock/pop detect signal 40. For example, the control circuitry 35 may comprise a microprocessor executing the steps of a control program, and/or the control circuitry may comprise suitable state machine circuitry.

What is claimed is:

1. A disk drive comprising:
   a disk;
   a head actuated radially over the disk; and
   control circuitry operable to:
      generate a first linear acceleration signal representing a first acceleration disturbance;
      generate a second linear acceleration signal representing a second acceleration disturbance;
      generate a third linear acceleration signal representing a thermal popping disturbance; and
      combine the first linear acceleration signal with the third linear acceleration signal to generate a fourth linear acceleration signal representing a combined physical shock disturbance and thermal popping disturbance.

2. The disk drive as recited in claim 1, wherein the control circuitry is further operable to combine the first and second linear acceleration signals to generate a rotational acceleration signal representing a rotational vibration disturbance.

3. The disk drive as recited in claim 2, wherein the control circuitry is further operable to generate a feed-forward compensation signal used to servo the head in response to the rotational acceleration signal.

4. The disk drive as recited in claim 1, wherein the control circuitry is further operable to abort a write operation if the fourth linear acceleration signal exceeds a threshold.

5. The disk drive as recited in claim 1, wherein a major frequency range of the thermal popping disturbance is substantially higher than a major frequency range of the physical shock disturbance.

6. The disk drive as recited in claim 1, wherein the control circuitry further comprises an adder for adding the first linear acceleration signal to the third linear acceleration signal to generate the fourth linear acceleration signal.

7. The disk drive as recited in claim 1, wherein the control circuitry further comprises:
   a first acceleration sensor operable to detect the first acceleration disturbance;
   a second acceleration sensor operable to detect the thermal popping disturbance;
   a first filter for filtering the output of the first acceleration sensor to generate the first linear acceleration signal, wherein a bandwidth of the first filter substantially covers major frequency ranges of the first acceleration disturbance and the physical shock disturbance; and
   a second filter for filtering the output of the second acceleration sensor to generate the third linear acceleration signal, wherein a bandwidth of the second filter substantially covers major frequency ranges of the thermal popping disturbance.

8. The disk drive as recited in claim 7, wherein a gain of the second filter is greater than a gain of the first filter.

9. A method of operating a disk drive, the disk drive comprising a disk, and a head actuated radially over the disk, the method comprising:
   generating a first linear acceleration signal representing a first acceleration disturbance;
   generating a second linear acceleration signal representing a second acceleration disturbance;
   generating a third linear acceleration signal representing a thermal popping disturbance; and
   combining the first linear acceleration signal with the third linear acceleration signal to generate a fourth linear acceleration signal representing a combined physical shock disturbance and thermal popping disturbance.

10. The method as recited in claim 9, further comprising combining the first and second linear acceleration signals to generate a rotational acceleration signal representing a rotational vibration disturbance.

11. The method as recited in claim 10, further comprising generating a feed-forward compensation signal used to servo the head in response to the rotational acceleration signal.

12. The method as recited in claim 9, further comprising aborting a write operation if the fourth linear acceleration signal exceeds a threshold.

13. The method as recited in claim 9, wherein a major frequency range of the thermal popping disturbance is substantially higher than a major frequency range of the physical shock disturbance.

14. The method as recited in claim 9, further comprising adding the first linear acceleration signal to the third linear acceleration signal to generate the fourth linear acceleration signal.

15. The method as recited in claim 9, further comprising:
   sensing the first acceleration disturbance to generate a first sense signal;
   sensing the thermal popping disturbance to generate a second sense signal;
   filtering the first sense signal to generate the first linear acceleration signal, wherein a bandwidth of the first filter substantially covers major frequency ranges of the first acceleration disturbance and the physical shock disturbance; and
   filtering the second sense signal to generate the third linear acceleration signal, wherein a bandwidth of the second filter substantially covers major frequency ranges of the thermal popping disturbance.

16. The method as recited in claim 15, wherein a gain of the second filtering is greater than a gain of the first filtering.

17. A disk drive comprising:
   a disk;
   a head actuated radially over the disk; and a means for generating a first linear acceleration signal representing a first acceleration disturbance;

a means for generating a second linear acceleration signal representing a second acceleration disturbance;

a means for generating a third linear acceleration signal representing a thermal popping disturbance; and a means for combining the first linear acceleration signal with the third linear acceleration signal to generate a fourth linear acceleration signal representing a combined physical shock disturbance and thermal popping disturbance.

* * * * *